United States Patent
Kawashima et al.

[19]

[11] Patent Number: 5,831,389
[45] Date of Patent: Nov. 3, 1998

[54] METHOD AND APPARATUS FOR CONTROLLING AN AUTOMOTIVE ROOM LAMP

[75] Inventors: Naoki Kawashima; Koichi Miyake; Yoshihiro Murase; Eri Nishikawa; Tamotsu Kurachi, all of Tokyo, Japan

[73] Assignees: Mitsubishi Jidosha Kogyo Kabushiki Kaisha; Mitsubishi Jidosha Engineering Kabushiki Kaisha, both of Tokyo, Japan

[21] Appl. No.: 716,403
[22] PCT Filed: Jan. 19, 1996
[86] PCT No.: PCT/JP96/00087
  § 371 Date: Nov. 22, 1996
  § 102(e) Date: Nov. 22, 1996
[87] PCT Pub. No.: WO96/22195
  PCT Pub. Date: Jul. 25, 1996

[30] Foreign Application Priority Data

Jan. 20, 1995 [JP] Japan .................................. 7-007765

[51] Int. Cl.$^6$ ...................................................... B60Q 1/02
[52] U.S. Cl. ................................ 315/77; 315/84; 307/10.8
[58] Field of Search ....................... 315/77, 84; 307/10.8

[56] References Cited

U.S. PATENT DOCUMENTS 4,866,345  9/1989  Kataoka ..................................... 315/84
5,604,407  2/1997  Andres et al. ............................ 315/77

FOREIGN PATENT DOCUMENTS

| 5938148 | 8/1982 | Japan . |
| 61-20656 | 2/1986 | Japan . |
| 63116949 | 10/1986 | Japan . |
| 63-176755 | 12/1986 | Japan . |
| 62-36155 | 3/1987 | Japan . |
| 1-171737 | 5/1989 | Japan . |
| 5-104997 | 10/1991 | Japan . |

*Primary Examiner*—Robert J. Pascal
*Assistant Examiner*—Justin P. Bettendorf

[57] ABSTRACT

A method and apparatus for controlling an au room lamp are provided, in which the room lamp is lit up when the ignition key is extracted from the ignition switch with an automotive door being closed, to thereby provide convenience for the driver and the passengers to get out of a car. A control unit (1) detects the on/off states of the ignition switch (2), a door switch (3) and an ignition key insertion/extraction detecting switch (4). If it is judged that the ignition key is extracted from the ignition switch with the door closed, the control unit turns on the room lamp (5) at a second luminance which is lower than a first luminance provided when the room lamp is on with the door being open, keeps the luminance of the room lamp for a predetermined time, and then turns off the room lamp.

15 Claims, 16 Drawing Sheets

F I G. 2
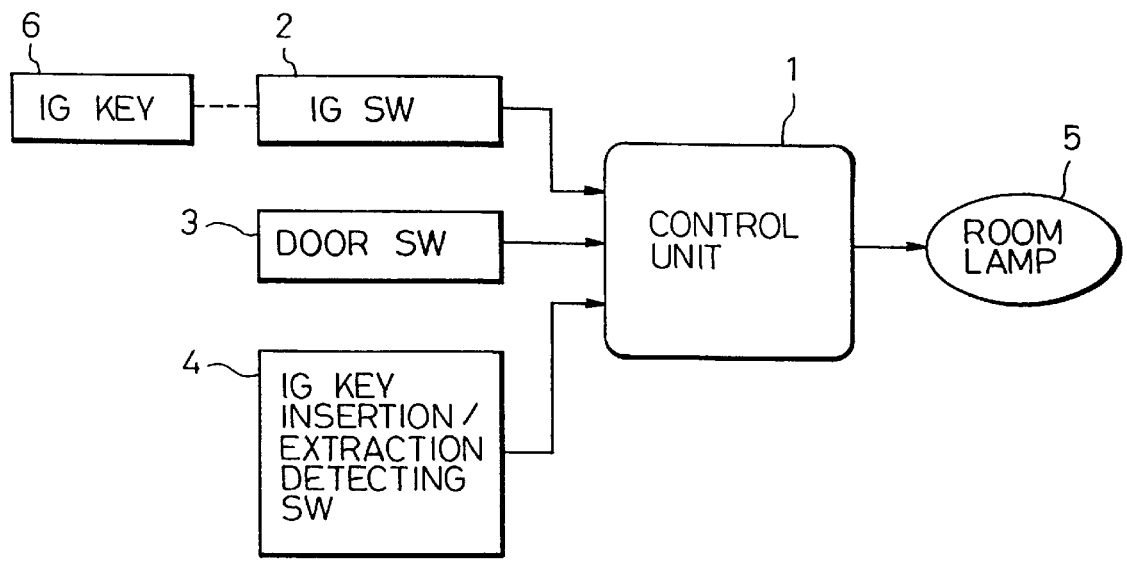

METHOD AND APPARATUS FOR CONTROLLING AN AUTOMOTIVE ROOM LAMP

TECHNICAL FIELD

The present invention relates to a method and apparatus for controlling an automotive room lamp.

BACKGROUND ART

A room lamp of an automobile is provided at or near the center of the roof in the automobile interior and is configured to be switched on and off in response to the operation of a manual switch or to the opening and closing of a door of the automobile. When the door is opened, the room lamp is switched from off usually to full luminance (see FIG. 1). The room lamp lights up if a door is incompletely closed, to indicate to the driver and passengers that the door is not fully closed.

Extinction control of the room lamp is carried out in various ways. For example, in some extinction control methods, the room lamp is instantly turned off when a predetermined period of time has elapsed from the moment at which a vehicle door was closed, as indicated by line A in FIG. 1. Another method gradually decreases the luminance of the room lamp from the moment at which the door has been closed or at which a predetermined time period has elapsed since the closing of the door, as indicated by line B or C in FIG. 1, until the room lamp is turned off. In still another method, the luminance of the room lamp is decreased by one step from full luminance at the moment at which the door is closed, and is then gradually decreased until the room lamp goes off, as indicated by line D in FIG. 1.

With any of these conventional room lamp control methods, however, the room lamp is kept switched off during a period from the moment when the driver pulls out the ignition key from the ignition switch to the moment when the driver or a passenger opens a door to get out of the car. Therefore, the driver and passengers must inconveniently operate inside lock knobs and inside handles to unlock and open doors in the dark.

On the occasion that the driver or a passenger gets out of the car, taking his/her belongings such as a bag or papers which were put on a passenger seat or the like, he or she is required to open the door to turn on the room lamp and then check and take the belongings before getting out of the car. Especially in rain or other inclement weather, it is necessary for the driver or the passenger to turn on the room lamp by turning on a manual switch, check and take the belongings, turn off the room lamp by turning off the manual switch, and then open the door to get out of the car. In this manner, heretofore, the operation from the extraction of the ignition key to getting out of the car not only is troublesome but also takes much time.

In addition, all of the above-described room lamp control methods are inadequate to provide a sense of security for the driver and the passengers to confirm that doors have been surely closed at the time of getting out of the car. According to the control methods of the types indicated by lines A and B in FIG. 1, the luminance of the room lamp does not change at the moment when an open door is closed. Only after a predetermined time period has elapsed since the closing of a door, the room lamp goes off or the luminance of the room lamp begins to decrease. Therefore, at the time of closing a door, there remains a sense of anxiety about the possibility of an incomplete door closing. With the control method of the type indicated by line C in FIG. 1, there still remains a similar sense of anxiety though not so much as the types indicated by lines A and B. With the control method of the type indicated by line D in FIG. 1, the luminance of the room lamp decreases by one step from the full luminance when an open door is closed, so that the aforementioned sense of anxiety is less. However, when the luminance of the room lamp decreases by one step, the driver and passengers sometimes feel that the room lamp is just flickering.

Moreover, if an off room lamp is lit up instantly at full luminance when a door is opened, occupants lack a sense of high quality, a sense of hospitality, a sense of controlled lighting, etc. For this reason, as well as the foregoing reasons, it is desirable that the method for controlling the room lamp be improved.

DISCLOSURE OF THE INVENTION

An object of the present invention is to provide a method for controlling an automotive room lamp, which can carry out an on/off control of the room lamp in response to the opening and closing of a door and to the insertion and extraction of the ignition key into and from the ignition switch.

To achieve the object, according to one aspect of the present invention, a method for controlling an automotive room lamp disposed in an interior of an automobile is provided, in which the room lamp is subject to an on/off control responsive to the opening and closing of a door of the automobile. This control method comprises the steps of detecting the opening and closing of the door, detecting insertion and extraction of an ignition key into and from an ignition switch of the automobile, and turning on the room lamp when the ignition key is extracted from the ignition switch with the door being closed.

According to the present invention, the room lamp is turned on at the moment when the ignition key is extracted from the ignition switch, so that the driver and the passengers can easily operate inside lock knobs and inside handles when they get out of the car. In the case of getting out of the car, taking belongings such as bags or papers, the driver and the passengers are permitted to check and handle their belongings with ease. Therefore, it is possible to shorten a time period from the extraction of ignition key to getting out of the car. Moreover, the control method of this invention can be embodied simply by changing a control program, without the need of changing specifications of existing room lamp control apparatuses, so that increased costs can be prevented.

In a control method according to a preferred embodiment of the present invention, the room lamp is switched off until it is lit up at a second luminance when the ignition key is extracted from the ignition switch with the door being closed. The second luminance is lower than a first luminance provided when the room lamp is switched on with the door being open. In this case, the luminance of the room lamp provided when the ignition key is extracted can be made clearly different from that provided when the door is opened (or closed incompletely). Therefore, when the room lamp is turned on in response to the extraction of the ignition key from the ignition switch, the drivers and passengers are freed from the anxiety about whether an incomplete door closure is causing the room lamp to be turned on.

In this embodiment, preferably, the room lamp is lit up at the first luminance at the moment when the door is opened while the room lamp is being lit up at the second luminance. This makes it easy for the driver and the passengers to get out of the car.

Preferably, the room lamp is kept lit up at the second luminance for a predetermined time period, and then the luminance of the room lamp is gradually decreased and the room lamp is turned off thereafter. In this case, the illumination in the automobile interior can be provided for a time period required for the driver and the passengers to operate inside lock knobs and inside handles when getting out of the car, and an operation of extinguishing the room lamp can provide occupants with a sense of high quality.

Preferably, the luminance of the room lamp is gradually decreased on and after an elapse of a predetermined time period since the door which was opened while the room lamp was being lit up at the second luminance was closed, and thereafter the room lamp is turned off. In this case, a signal given by the room lamp and indicative of closing the door can be clarified, thereby enhancing a sense of security.

Preferably, the luminance of the room lamp is decreased once to a third luminance when the door which was opened while the room lamp was being lit up at the second luminance is closed. The third luminance is lower than the first luminance and higher than the second luminance. In this case as well, the door-closure indication signal given by the room lamp can be clarified, thereby enhancing a sense of security.

Preferably, the luminance of the room lamp is decreased once to the third luminance when a predetermined time period has elapsed since the door which was opened while the room lamp was being lit up at the second luminance was closed. Thereafter, the luminance of the room lamp is gradually decreased from the third luminance, and then the room lamp is switched off. In this case, the door-closure indication signal given by the room lamp can be clarified, thereby enhancing a sense of security. Also, an operation of extinguishing the room lamp can be made in a manner providing a sense of high grade.

Preferably, the luminance of the room lamp kept switched off is gradually increased to the second luminance from the moment when the ignition key is extracted from the ignition switch with the door being closed. The second luminance is lower than the first luminance provided when the room lamp is switched on with the door being open. In this case, the illumination of the automobile interior provides occupants with a sense of high quality, a sense of hospitality, and a sense of control.

Preferably, the luminance of the room lamp is gradually increased from the second luminance to the first luminance when the door is opened while the room lamp is being lit up at the second luminance. In this case as well, the room illumination provides occupants with a sense of high quality, a sense of hospitality, and a sense of control.

According to another aspect of the present invention, an apparatus is provided for controlling an automotive room lamp disposed in an interior of an automobile, in which the room lamp is subject to an on/off control responsive to the opening and closing of a door of the automobile. This apparatus comprises door opening/closing detecting means for detecting the opening and closing of the door and for outputting a door-closure signal when the door is closed; insertion/extraction detecting means for detecting insertion and extraction of an ignition key into and from an ignition switch of the automobile and for outputting an ignition-key-extraction signal when the ignition key is extracted from the ignition switch; and control means for turning on the room lamp when supplied with the door-closure signal from the door opening/closing detecting means and with the ignition-key-extraction signal from the insertion/extraction detecting means.

Preferably, the control means causes the room lamp to be switched on and, to be lit up at a second luminance when the ignition key is extracted from the ignition switch with the door being closed. The second luminance is lower than a first luminance provided when the room lamp is switched on with the door being open.

Preferably, with the door closed, the control means keeps the room lamp lit up at the second luminance for a predetermined time, gradually decreases the luminance of the room lamp, and then turns off the room lamp.

Preferably, the control means turns on the room lamp at the first luminance when the door is opened while the room lamp is being lit up at the second luminance.

Preferably, the control means gradually decreases the luminance of the room lamp from the first luminance once a predetermined time period has elapsed after opening of the door while the room lamp was being lit up at the second luminance. Then, the control means turns off the room lamp.

Preferably, the control means causes the room lamp to be switched on and, to be gradually increased, to a second luminance when the ignition key is extracted from the ignition switch with the door being closed. The second luminance is lower than a first luminance provided when the room lamp is switched on with the door being open.

The control apparatus of the present invention and the preferred embodiments thereof have various advantages which are the same as those achieved by the above-mentioned control methods of the present invention.

BRIEF DESCRIPTION OF THE DRAWINGS

FIG. 2 is a schematic block diagram showing an automotive room lamp control apparatus according to one embodiment of the present invention;

BEST MODE FOR CARRYING OUT THE INVENTION

Figure 1:
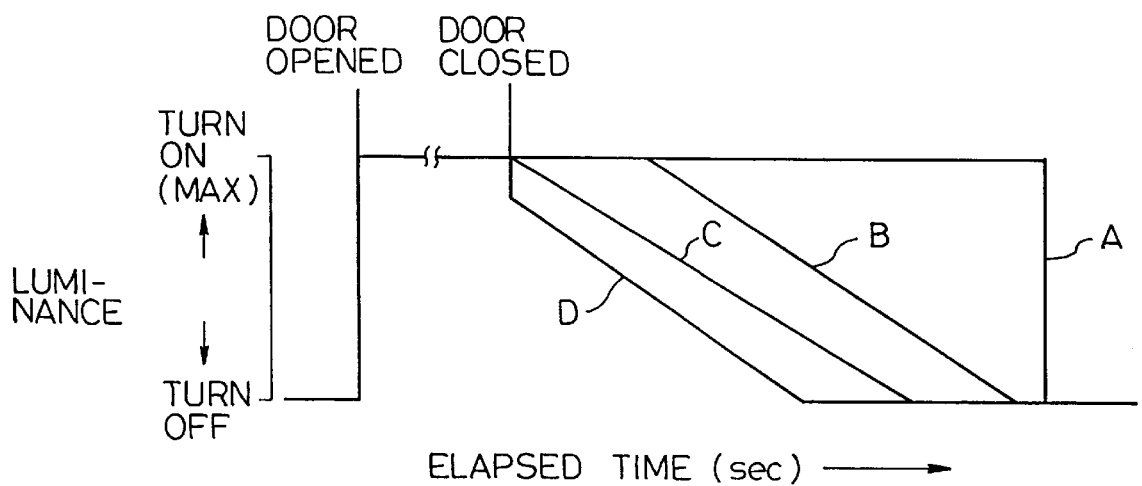
FIG. 1 is a graph showing a change in luminance of a room lamp with elapse of time in a conventional method for controlling an automotive room lamp in response to the opening and closing of a door.

An automotive room lamp control apparatus of the present invention will be described below.

This control apparatus is designed to control the turning on/off of an automobile interior lamp (room lamp) 5 which is disposed in the interior of an automobile. As shown in FIG. 2, the control apparatus includes a door switch (door opening/closing detecting means) 3 for detecting the opening and closing of any of respective doors of the automobile; an ignition-key insertion/extraction detecting switch (insertion/extraction detecting means) 4 for detecting the insertion and extraction of an ignition key (hereinafter called an IG key) 6 into and from an ignition switch (hereinafter called an IG switch) 2 of the automobile; and a control unit (control means) 1 which is connected electrically to the door switch 3 and the detecting switch 4.

The IG-key insertion/extraction detecting switch 4 is switched on when the IG key 6 is inserted into a key hole of the IG switch 2, and is switched off when the IG key 6 is extracted from the key hole of the IG switch 2. The IG switch 2 is switched off when the IG key 6 inserted into the key hole is at the IG-off position, and switched on when the IG key 6 is at the IG-on position. The door switch 3 is turned on when any one of the doors is opened, and turned off when all of the doors are closed. The detecting switch 4 can be constituted in the same manner as a switch which is disclosed, for example, in Japanese Provisional Utility Model Publication No. 61-20656 or No. 62-36155.

The control unit 1 has a computer which is connected to the IG switch 2, the door switch 3, and the IG-key insertion/extraction detecting switch 4. The computer calculates a drive duty ratio of the room lamp 5 in accordance with the on/off states of the switches 2, 3, and 4, and outputs a duty ratio signal. The control unit has a lamp drive circuit which causes the room lamp 5 to be turned on and off in accordance with the duty ratio signal outputted from the computer and which regulates the luminance of the room lamp 5 when the room lamp 5 is switched on.

The lamp drive circuit includes a power transistor having a base which receives the duty ratio signal supplied from the computer. When the transistor receives the duty ratio signal and is hence brought into conduction, a drive current flows from a battery to the room lamp 5 via the transistor, so that the room lamp 5 is lit up. The luminance of the room lamp 5 varies in accordance with the duty ratio.

In detecting the insertion and extraction of the IG key 6, it is not essential to employ the IG-key insertion/extraction detecting switch 4 designed for this purpose. A conventional steering-wheel lock switch may be used as the detecting switch 4.

The operation of the control apparatus shown in FIG. 2 will be described below.

Figure 3:
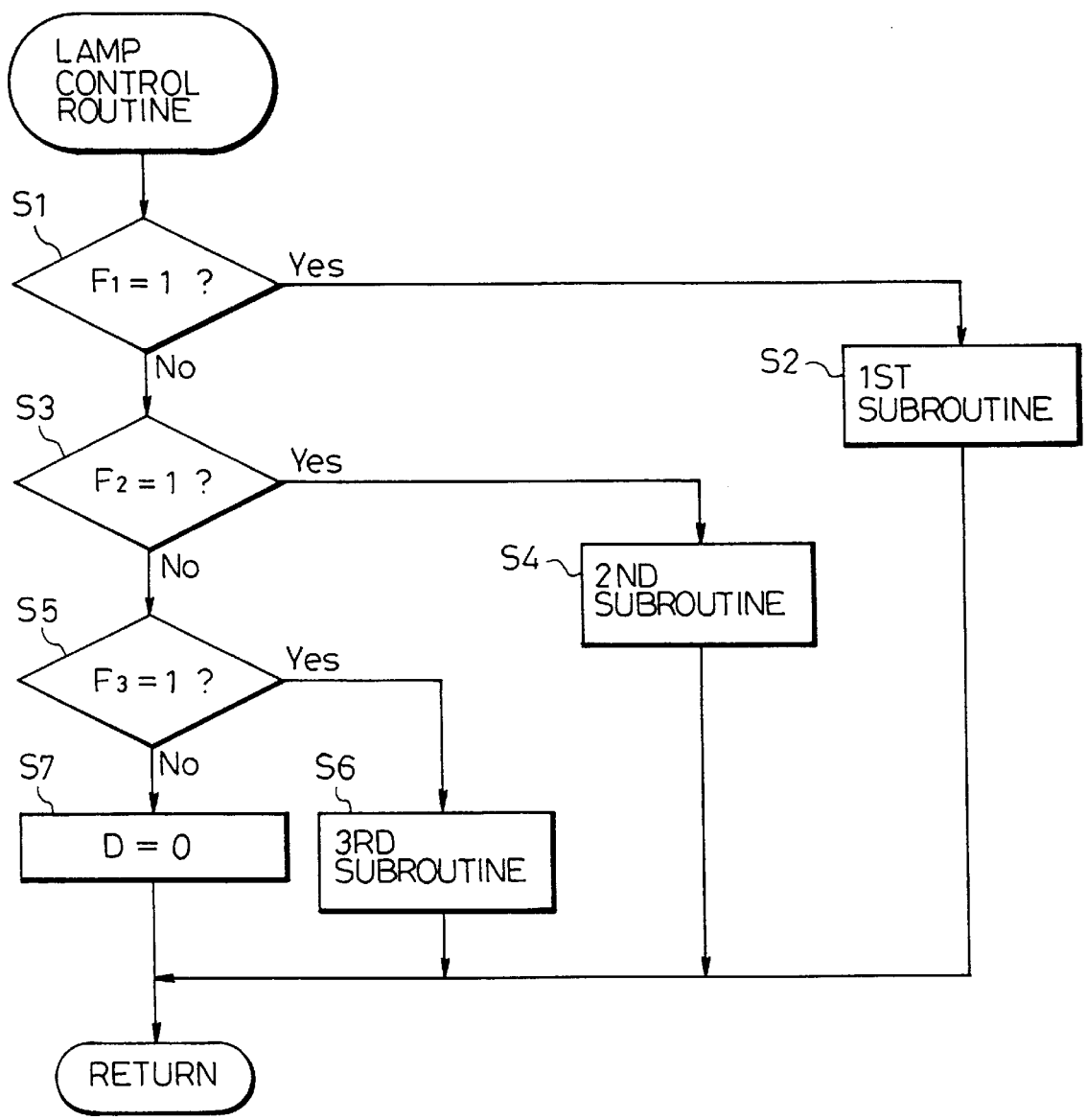
FIG. 3 is a flowchart for a lamp control routine executed by a control unit shown in FIG. 2.

The control unit 1 of the control apparatus executes a room lamp control routine shown in FIG. 3 at intervals of a predetermined period. In this control routine, if it is concluded in Step S1 that the value of a flag $F_1$ is "1", then a first subroutine, described later, is executed in Step S2. If it is concluded in Step S3 that the value of a flag $F_2$ is "1", a second subroutine, described later, is executed in Step S4. If it is concluded in Step S5 that the value of a flag $F_3$ is "1", a third subroutine, described later, is executed in Step S6. If the values of the flags $F_1$, $F_2$, and $F_3$ are not "1", the drive duty ratio D of the room lamp 5 is set at 0% and is output (Step S7). When the duty ratio D of 0% is output, the transistor in the lamp drive circuit of the control unit 1 is cut off. As a result, no driving current flows in the room lamp 5, so that the room lamp 5 goes off. When the execution of the first, second, or third subroutine in Step S2, S4, or S6 is completed or when the setting of the duty ratio D at 0% in Step S7 is completed, this lamp control routine is executed again from Step S1.

Figure 4:
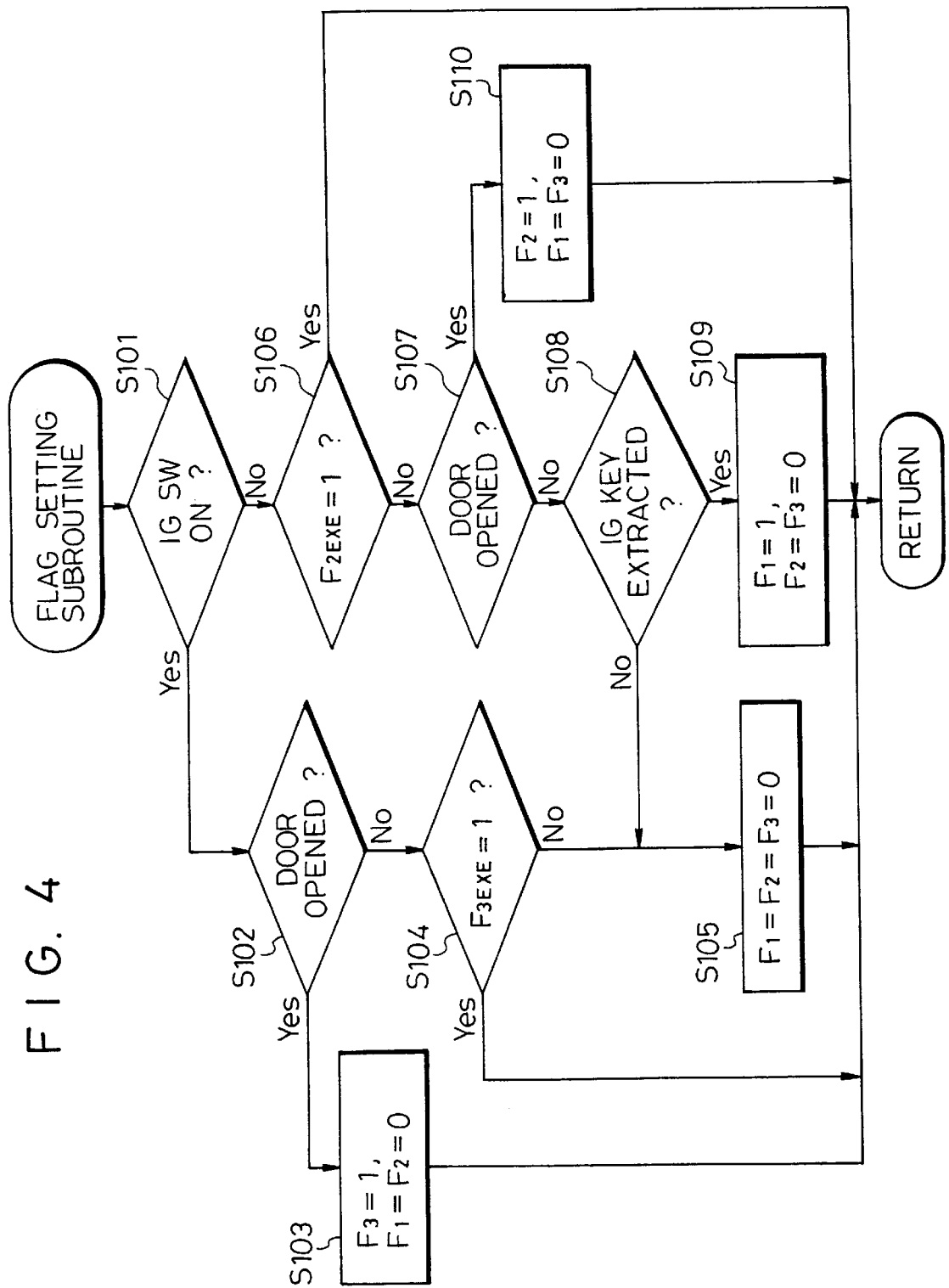
FIG. 4 is a flowchart for a flag setting subroutine executed by the control unit.

FIG. 4 shows a flag setting subroutine which is executed by the control unit 1 at intervals of a predetermined time period in parallel with the above-described lamp control routine.

In this flag setting subroutine, whether or not the IG switch 2 is switched on is determined (Step S101). If the result of this determination is Yes, whether or not the door switch 3 is switched on is determined, to thereby determine whether a door is opened or not (Step S102). If the result of this determination is Yes, the flags $F_1$ and $F_2$ are reset to a value of "0", respectively, and the flag $F_3$ is set to a value of "1" (Step S103). On the other hand, if the determination result in Step S102 is No, a determination is made as to whether or not the value of a flag $F_{3EXE}$ is "1" which indicates that a second half of the third subroutine is being executed (Step S104). If the determination result in Step S104 is No, that is, if the IG switch is on, the doors are kept closed, and the second half of the third subroutine is not being executed, then the flags $F_1$, $F_2$, and $F_3$ are reset to a value of "0", respectively (Step S105).

If the result of the determination in Step S101 is No, that is, if it is concluded that the IG switch 2 is not switched on, then a determination is made as to whether or not the value of a flag $F_{2EXE}$ is "1" which indicates that a second half of the second subroutine is being executed (Step S106). If the result of this determination is No, whether or not a door is opened is determined (Step S107). If the determination result in Step S107 is No, it is determined whether or not the IG-key insertion/extraction detecting switch 4 is switched off, to thereby determine whether or not the IG key is extracted from the IG switch 2 (Step S108). If the result of this determination is No, that is, if the IG switch is off, the second subroutine is not being executed, the doors are closed, and the IG key is kept inserted, then the control flow advances to the aforementioned Step S105. On the other hand, if the determination result in Step S108 is Yes, that is, if the IG key 6 has been extracted under the conditions that the IG switch is off, the second subroutine is not being executed, and the doors are closed, then the flag $F_1$ is set to a value of "1" and the flags $F_2$ and $F_3$ are reset to a value of "0", respectively (Step S109).

If the determination result in the Step S107 is Yes, that is, if it is concluded that a door has been opened under the conditions that the IG switch is off and the second subroutine is not being executed, then the flag $F_2$ is set to a value of "1" and the flags $F_1$ and $F_3$ are reset to a value of "0", respectively (Step S110).

If the flag setting in Step S103, S105, S109, or S110 is completed, or if the determination result in Step S104 or S106 is Yes (the third subroutine or the second subroutine is being executed), the execution of the flag setting subroutine in this control cycle is completed. In other words, the flags already set are kept unchanged while the second or third subroutine is being executed. This subroutine is executed again when a predetermined time period, corresponding to the execution interval of the subroutine, has elapsed.

If the flag $F_1$ is set to a value of "1" in the above-described flag setting subroutine, the first subroutine will be executed in the lamp control subroutine in FIG. 3.

Figure 5:
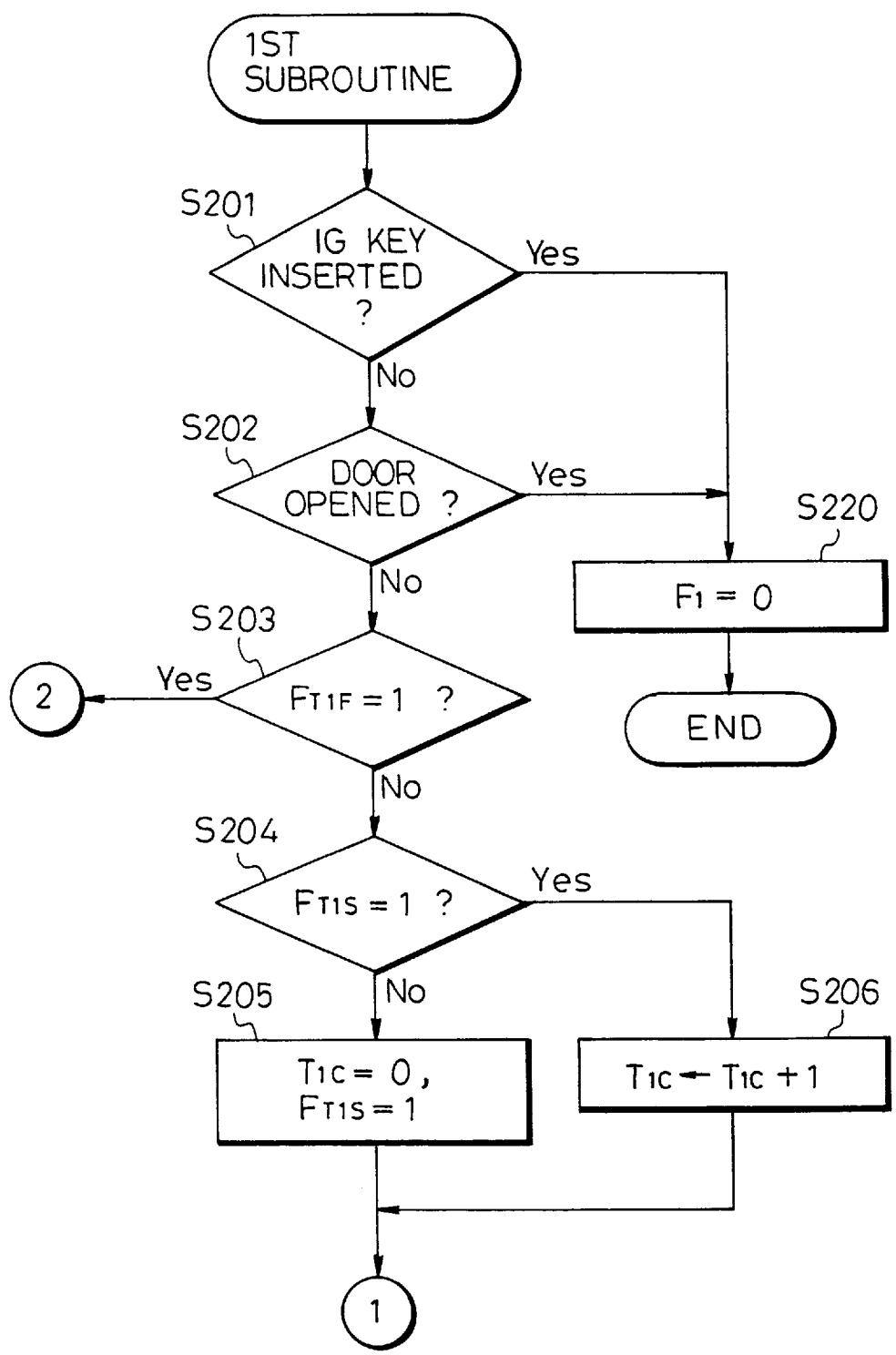
FIG. 5 is a flowchart showing in detail a part of a first subroutine shown in FIG. 3.
Figure 6:
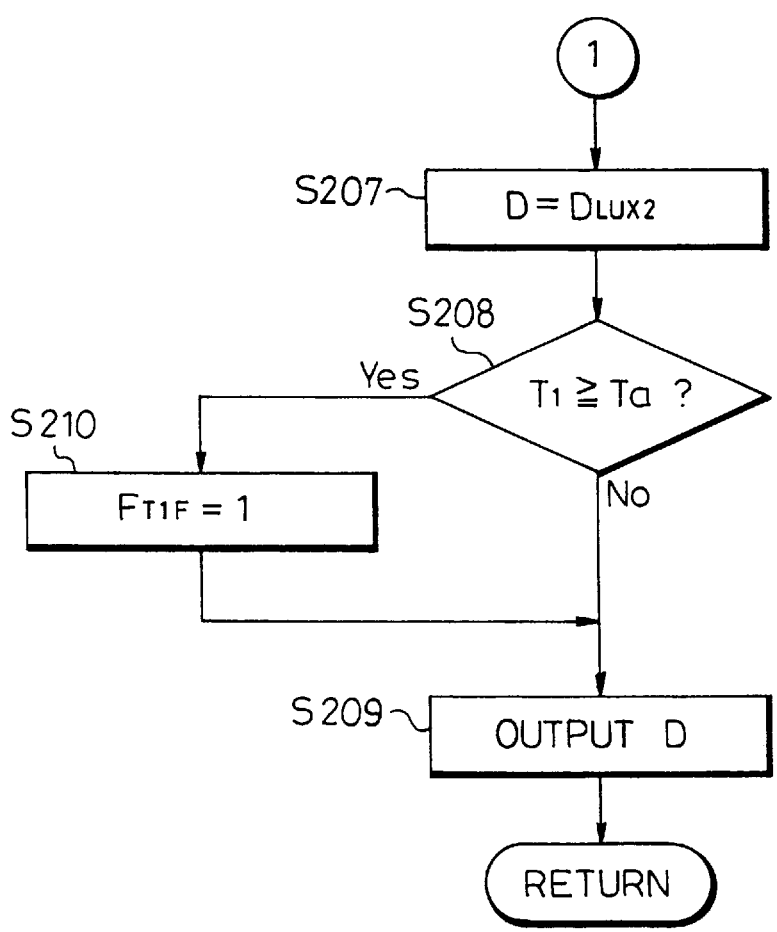
FIG. 6 is a flowchart showing in detail another part of the first subroutine.
Figure 7:
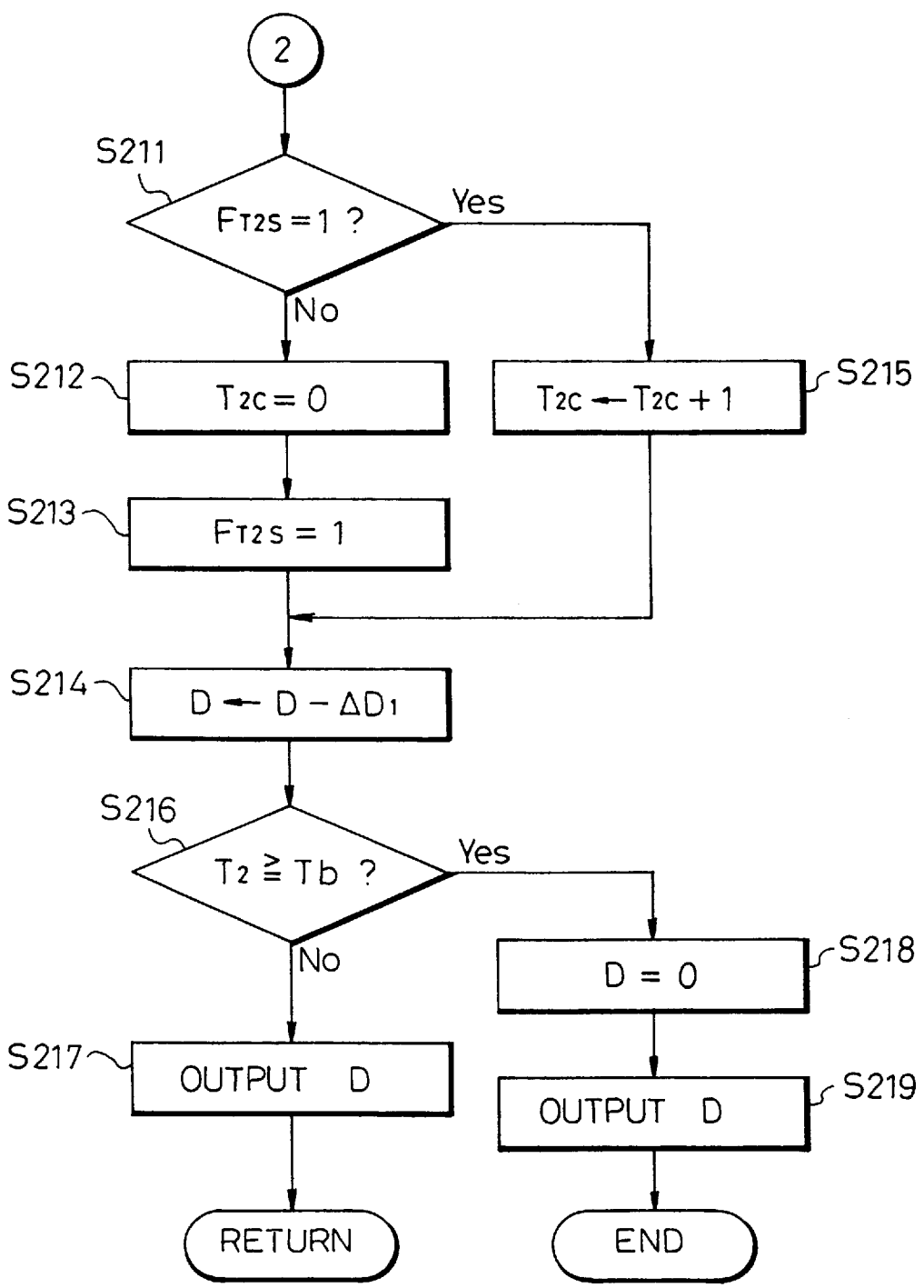
FIG. 7 is a flowchart showing in detail the remainder of the first subroutine.

As shown in detail in FIGS. 5, 6, and 7, in the first subroutine, whether or not the IG key 6 is inserted into the IG switch 2 is determined (Step S201). If the result of this determination is No, it is further determined whether a door is opened or not (Step S202). If the result of this determination is No, a further determination is made as to whether or not the value of a flag $F_{T1F}$ is "1" which indicates that a first half of the first subroutine has been completed (Step S203). If the result of this determination is No, whether or not the value of a flag $F_{T1S}$ is "1" which indicates that the first half of the first subroutine is being executed is determined (Step S204). If the determination result in Step S204 is No, the count value $T_{1C}$ of a first timer is reset to "0" and the flag $F_{T1S}$ is set to a value of "1" (Step S205). On the other hand, if the determination result in Step S204 is Yes, a value of "1" is added to the count value $T_{1C}$ (Step S206).

In Step S207 (FIG. 6) following Step S205 or S206, the drive duty ratio D is set at a value of $D_{LUX2}$ (for example, 50%). In the next Step S208, it is determined whether or not a time period $T_1$ (a product of the count value $T_{1C}$ and the control period) measured by the first timer is equal to or longer than a predetermined time period $T_a$ (for example, 5 seconds). If the determination result in Step S208 is No, the duty ratio D (=$D_{LUX2}$) updated in Step S207 is output (Step S209). As a result, the room lamp 5 is lit up at the luminance of LUX2 corresponding to the duty ratio $D_{LUX2}$.

If the predetermined time $T_a$ has elapsed and hence the determination result in Step S208 becomes Yes, the flag $F_{T1F}$ is set to a value of "1" (Step S210), and then the Step S209 is executed. In this case, the determination result in the Step S203 in the next cycle becomes Yes, so that the control flow advances to Step S211 in FIG. 7 where it is determined whether or not the value of a flag $F_{T2S}$ is "1" which indicates that a second half of the first subroutine is being executed. If the result of this determination is No, then the count value $T_{2C}$ of a second timer is reset to "0" (Step S212), the flag $F_{T2S}$ is set to a value of "1" (Step S213), and a predetermined value $\Delta D_1$ is subtracted from the drive duty ratio D (Step S214). On the other hand, if the determination result in Step S211 is Yes, a value of "1" is added to the count value $T_{2C}$ of the second timer in Step S215. Whereupon, the control flow advances to the aforementioned Step S214.

At Step S216 following Step S214, it is determined whether or not a time period $T_2$ (corresponding to the count value $T_{2C}$) measured by the second timer is equal to or longer than a predetermined time period $T_b$ (for example, 5 seconds If the result of this determination is No, the duty ratio D updated in Step S214 is output (Step S217). Consequently, the luminance of the room lamp 5 gradually decreases from the luminance of LUX2 as time elapses.

Subsequently, if the predetermined time period $T_b$ has elapsed and hence the determination result in Step S216 becomes Yes, then the duty ratio D is reset to 0% (Step S218), and this duty ratio D (=0%) is output (Step S219). As a consequence, the room lamp 5 goes off, and the execution of the first subroutine terminates.

If the IG key 6 is inserted into the IG switch 2 or a door is opened while the first subroutine is being executed, so that the determination result in Step S201 or S202 becomes Yes, the control flow advances to Step S220 in which the flag $F_1$ is reset to a value of "0". Whereupon, the execution of the first subroutine is discontinued.

Figure 13:
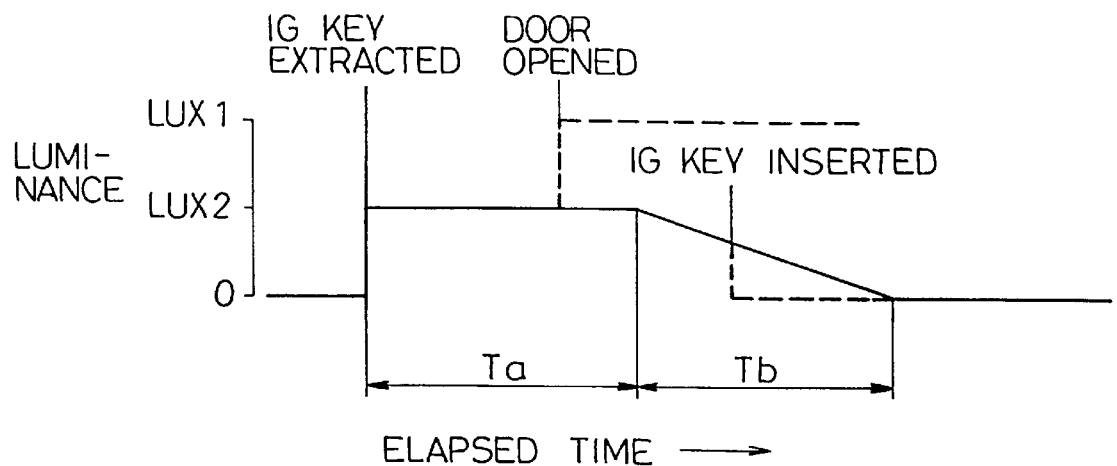
FIG. 13 is a graph showing a change in luminance of a room lamp with elapse of time, caused by the execution of the first subroutine.

As described above, when the driver turns the IG key 6 from the IG-on position to the IG-off position and then withdraws the IG key 6 from the IG switch 2 before opening the door, the flag $F_1$ is set to a value of "1" in the flag setting subroutine in FIG. 4, and the first subroutine is executed in the lamp control routine in FIG. 3. In this case, the luminance of the room lamp 5 is controlled as shown in FIG. 13.

Specifically, when the IG key 6 is extracted, the room lamp 5, kept switched off until then, is lit up at a second luminance LUX2 (for example, 50% of LUX1) which is lower than a first luminance LUX1 provided when the room lamp 5 is on with the door being opened. This luminance is kept unchanged until a predetermined time period $T_a$ (for example, 5 seconds) elapses from the start of lighting-up of the room lamp 5.

As described above, auxiliary illumination is provided by the room lamp 5 when the IG key 6 is extracted, so that the driver and the passengers can easily operate inside lock knobs and inside handles at the time of getting out of the car. Since the luminance LUX2 of the room lamp 5 is lower than the luminance LUX1, the luminance of the room lamp 5 at the moment when the IG key 6 is extracted is clearly different from the luminance at the moment when the door is opened, so that it can be realized that the lighting-up of the room lamp 5 is not due to an incompletely closed door.

On and after an elapse of the predetermined time $T_a$, the luminance of the room lamp 5 gradually decreases from LUX2 until a predetermined time period $T_b$ (for example, 5 seconds) elapses. Upon elapse of the predetermined time $T_b$, the lamp 5 goes off. In other words, the luminance of the room lamp 5 is subject to a fade-out control.

Next, the second subroutine will be described. When a door is opened with the IG switch 2 being switched off, the flag $F_2$ is set to a value of "1" and the flags $F_1$ and $F_3$ are reset to a value of "0", respectively, in the flag setting subroutine in FIG. 4. In this case, the second subroutine will be executed in the lamp control routine in FIG. 3.

Figure 8:
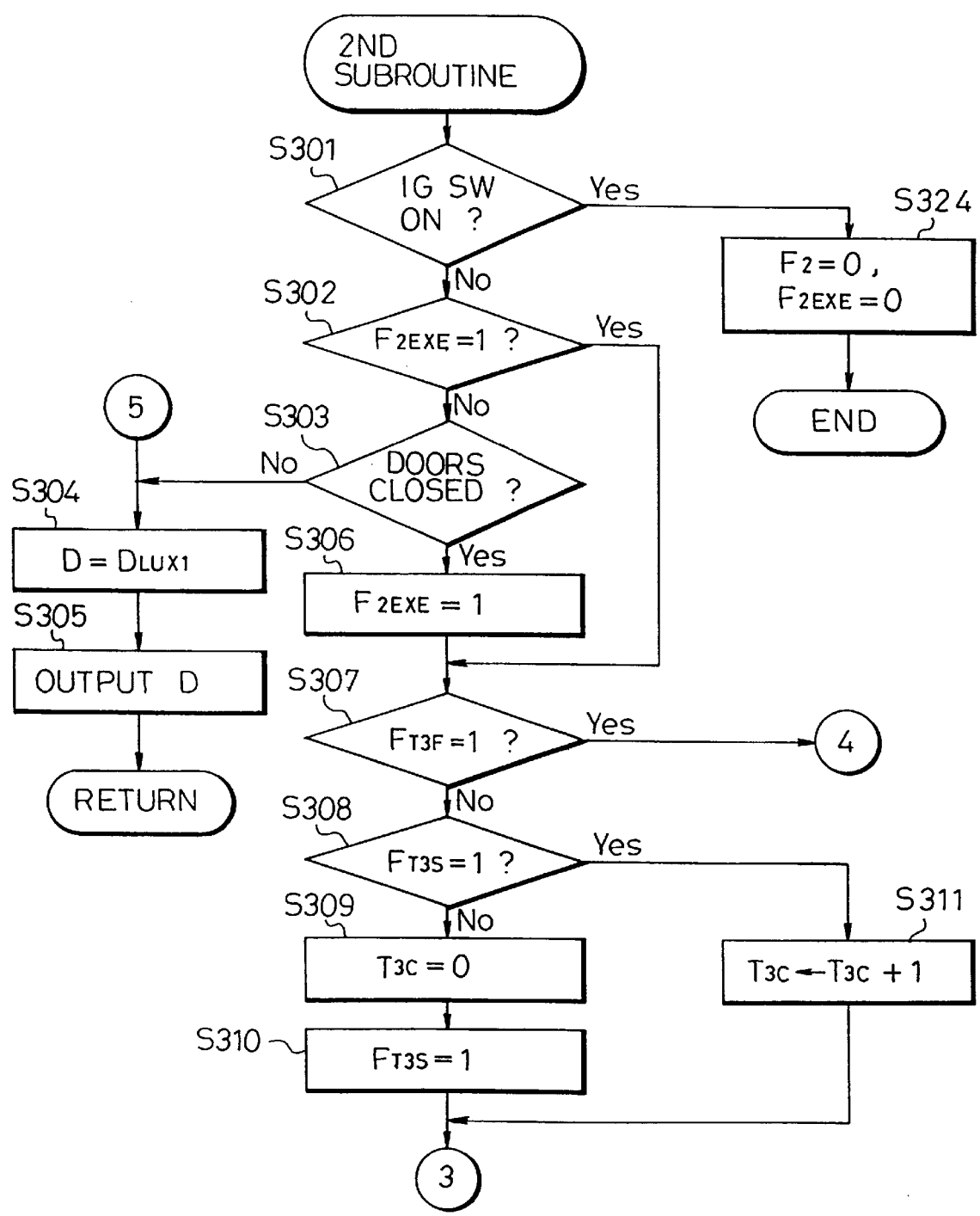
FIG. 8 is a flowchart showing in detail a part of a second subroutine shown in FIG. 3.
Figure 9:
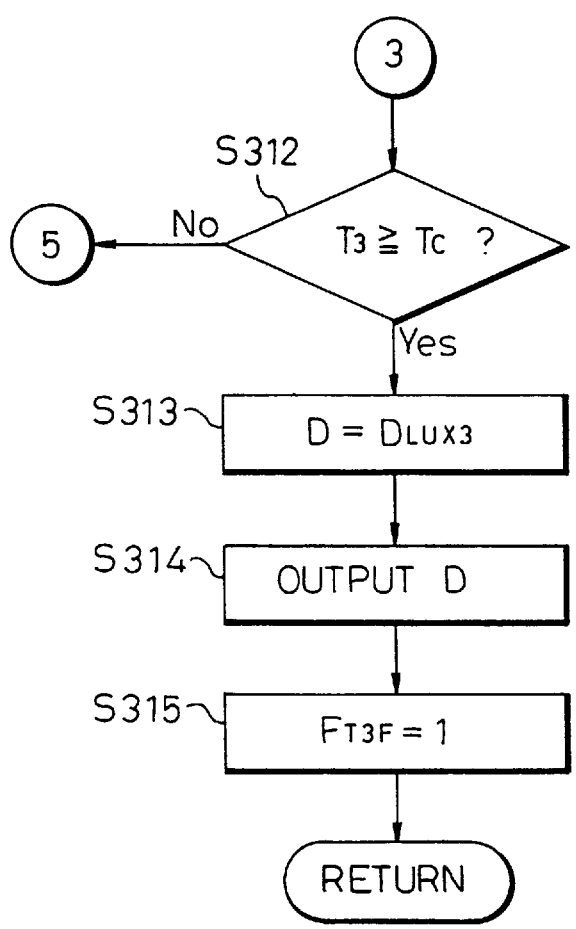
FIG. 9 is a flowchart showing in detail another part of the second subroutine.
Figure 10:
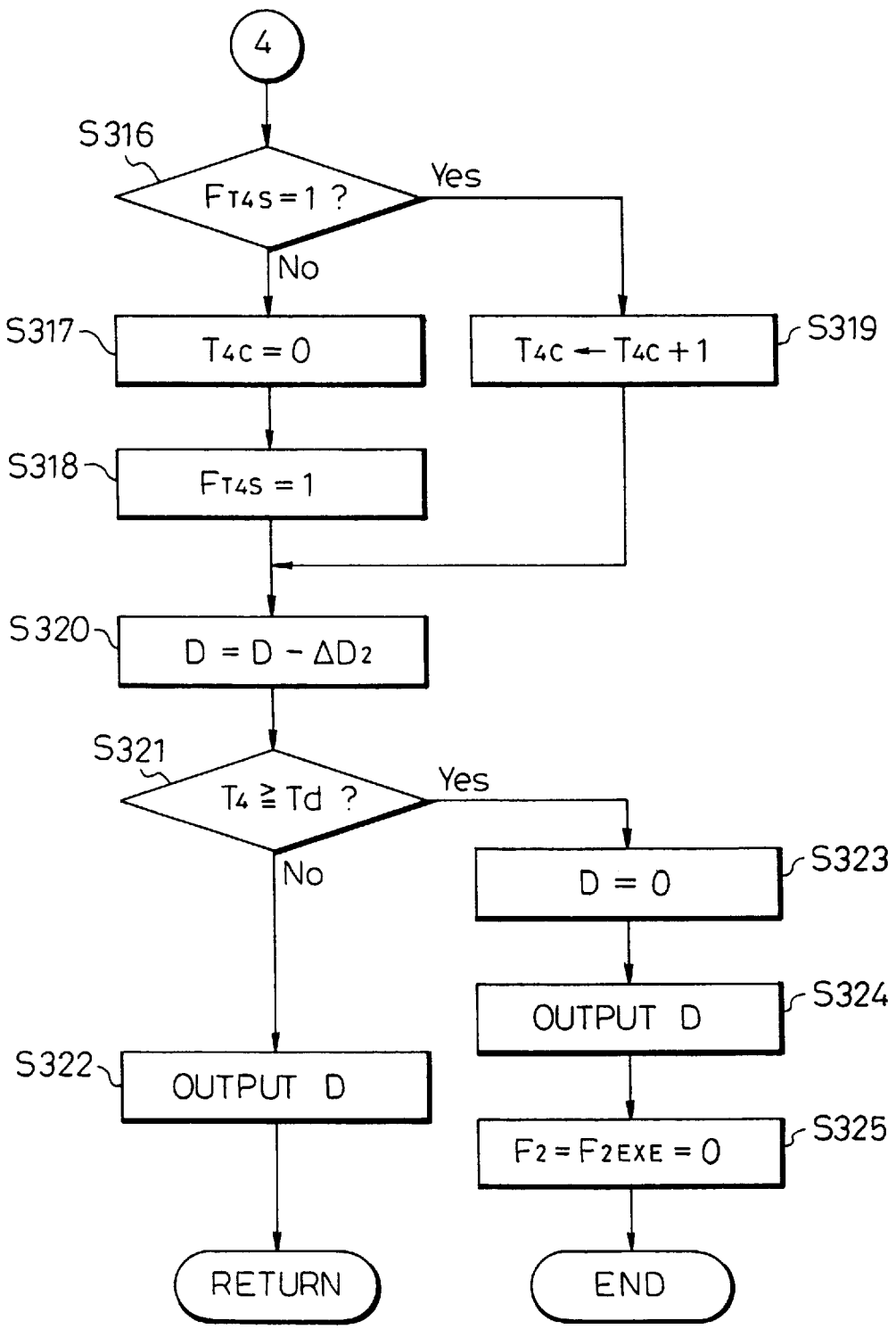
FIG. 10 is a flowchart showing in detail the remainder of the second subroutine.

As shown in detail in FIGS. 8, 9, and 10, in the second subroutine, it is determined whether or not the IG switch is switched on (Step S301). If the result of this determination is No, whether or not the value of the flag $F_{2EXE}$ is "1" which indicates that a second half of the second subroutine is being executed is determined (Step S302). If the result of this determination is No, whether or not the doors are closed is determined (Step S303). If the determination result in Step S303 is No, the duty ratio D is set at a value of $D_{LUX1}$ (Step S304), and this duty ratio $D_{LUX1}$ (for example, 100%) is output (Step S305). Consequently, the room lamp 5 comes on at the luminance LUX1 corresponding to the duty ratio $D_{LUX1}$.

If the doors are closed while the first half, in which the room lamp 5 is lit up at the luminance of LUX1, of the second subroutine is being executed ($F_{2EXE}=0$), that is, if the determination result in Step S303 is Yes, the flag $F_{2EXE}$ is set to a value of "1" which indicates that the second half of the second subroutine is being executed (Step S306). Next, whether or not the value of a flag $F_{T3F}$ is "1", which indicates that the execution of the second half of the second subroutine has been completed, is determined (Step S307). If the result of this determination is No, it is further determined whether or not the value of a flag $F_{T3S}$ is "1" which indicates that the second half of the second subroutine is being executed (Step S308). If the result of this determination is No, the count value $T_{3C}$ of a third timer is reset to "0" (Step S309), and the flag $F_{T3S}$ is set to a value of "1" (Step S310). On the other hand, the determination result in Step S308 is Yes, a value of "1" is added to the count value $T_{3C}$ (Step S311).

In Step S312 following Step S310 or S311, it is determined whether or not a time period $T_3$ (corresponding to the count value $T_{3C}$) measured by the third timer is equal to or longer than a predetermined time period $T_c$ (for example, 0.3 to 0.7 second, preferably 0.5 second). If the result of this determination is No, the control flow advances to the aforementioned Step S304.

Afterwards, if the predetermined time $T_c$ has elapsed and thus the determination result in Step S312 becomes Yes, the duty ratio is set at a value of $D_{LUX3}$, and this duty ratio LUX3 is output (Step S314). Consequently, the luminance of the room lamp 5 is controlled so as to be decreased from the luminance of LUX1 to the luminance of LUX3 (for example, 75% of LUX1) corresponding to the duty ratio $D_{LUX3}$. Then, a flag $F_{T3F}$ is set to a value of "1" (Step S315).

If it is concluded in Step S307 that the value of the flag $F_{T3F}$ is "1", the control flow advances to Step S316 in FIG. 10, where it is determined whether or not the value of a flag $F_{T4S}$ is "1" which indicates that the luminance of the room lamp 5 is being controllably decreased. If the result of this determination is No, the count value $T_{4C}$ of a fourth timer is reset to "0" (Step S317), and a flag $F_{T4S}$ is reset to a value of "1" (Step S318). On the other hand, if the determination result in Step S316 is Yes, a value of "1" is added to the count value $T_{4C}$ of the (Step S319).

In Step S320 following Step S318 or S319, a predetermined value $\Delta D_2$ is subtracted from the duty ratio D. In Step S321, a determination is made as to whether or not a time period $T_4$ (corresponding to the count value $T_{4C}$) measured by the fourth timer is equal to or longer than a predetermined time period $T_d$ (for example, 7 seconds). If the determination result in Step S321 is No, the duty ratio D updated in Step S320 is output (Step S322). Consequently, the luminance of the room lamp 5 is controlled so as to be decreased.

If the predetermined time $T_d$ has elapsed and hence the determination result in Step S321 becomes Yes, the duty ratio D is set to "0" and is output (Steps S323 and S324), so that the room lamp 5 goes off. Then, the flags $F_2$ and $F_{2EXE}$ are reset to a value of "0", respectively (Step S325), and the execution of the second subroutine is discontinued.

If it is concluded in Step S301 that the IG switch 2 is turned on during the execution of the second subroutine, the flags $F_2$ and $F_{2EXE}$ are reset to a value of "0", respectively (Step S324), and the execution of the second subroutine terminates.

Figure 14:
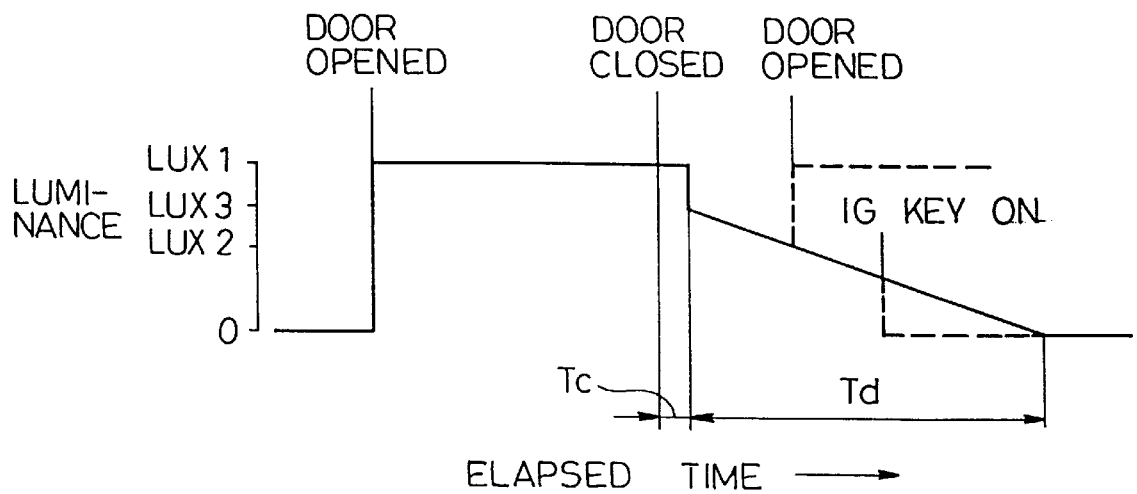
FIG. 14 is a graph showing a change in luminance of a room lamp with elapse of time, caused by the execution of the second subroutine.

As described above, if a door is opened after the driver turns the IG key 6 from the IG-on position to the IG-off position, the flag $F_2$ is set to a value of "1" in the flag setting subroutine in FIG. 4, and the second subroutine is executed in the lamp control subroutine in FIG. 3. In this case, the luminance of the room lamp 5 is controlled as shown in FIG. 14.

Specifically, when the door is opened, the room lamp 5 then switches from an off condition and comes on at a first luminance LUX1. When the door is closed thereafter, the luminance of the room lamp 5 is decreased by one step to the third luminance LUX3 upon elapse of the predetermined time period $T_c$ (for example, 0.5 second) from the moment at which the door is closed. The third luminance is lower than the first luminance LUX1 and higher than the second luminance LUX2. Until the predetermined time $T_d$ (for example, 7 seconds) elapses from that time, the luminance of the room lamp 5 is gradually decreased from LUX3. When the predetermined time $T_d$ has elapsed, the room lamp 5 is turned off. As a result, the signal of "door closed" is clarified.

Next, the third subroutine will be described. If a door is opened with the IG switch 2 switched on, the flag $F_3$ is set to a value of "1" and the flags $F_1$ and $F_2$ are reset to a value of "0", respectively, in the flag setting routine shown in FIG. 4. In this case, the third subroutine is executed in the lamp control routine in FIG. 3.

Figure 11:
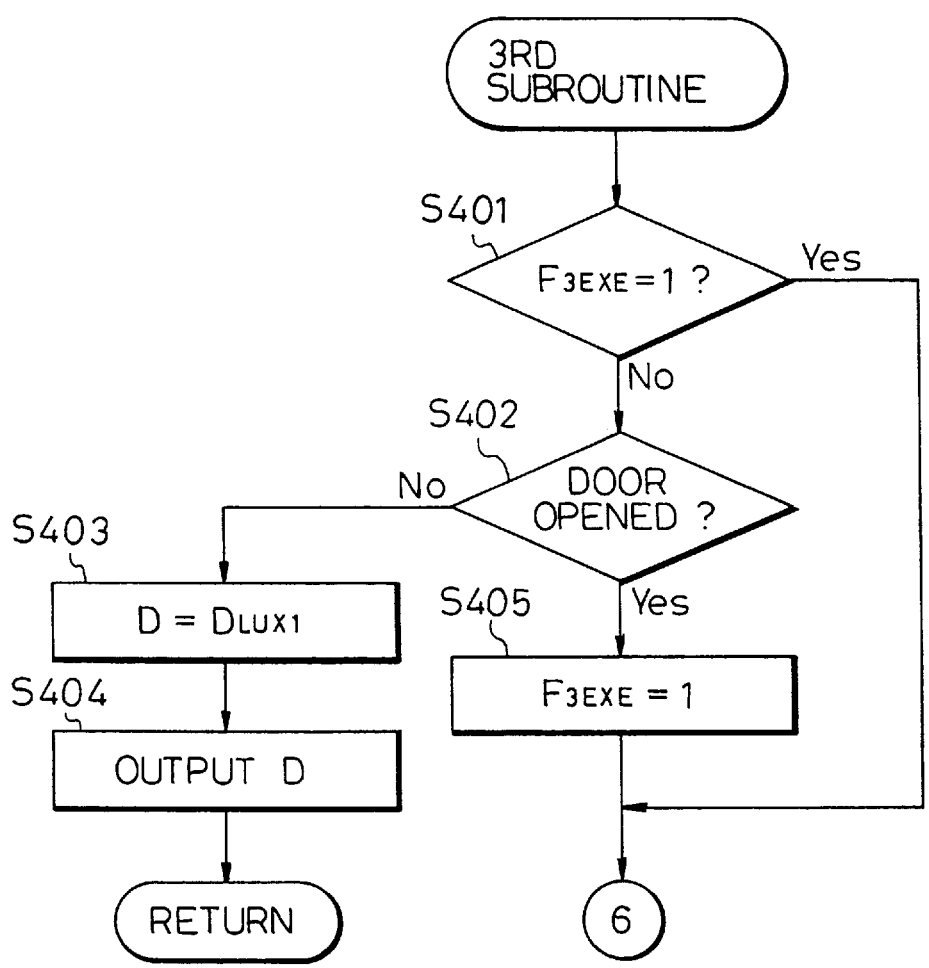
FIG. 11 is a flowchart showing in detail a part of a third subroutine shown in FIG. 3.
Figure 12:
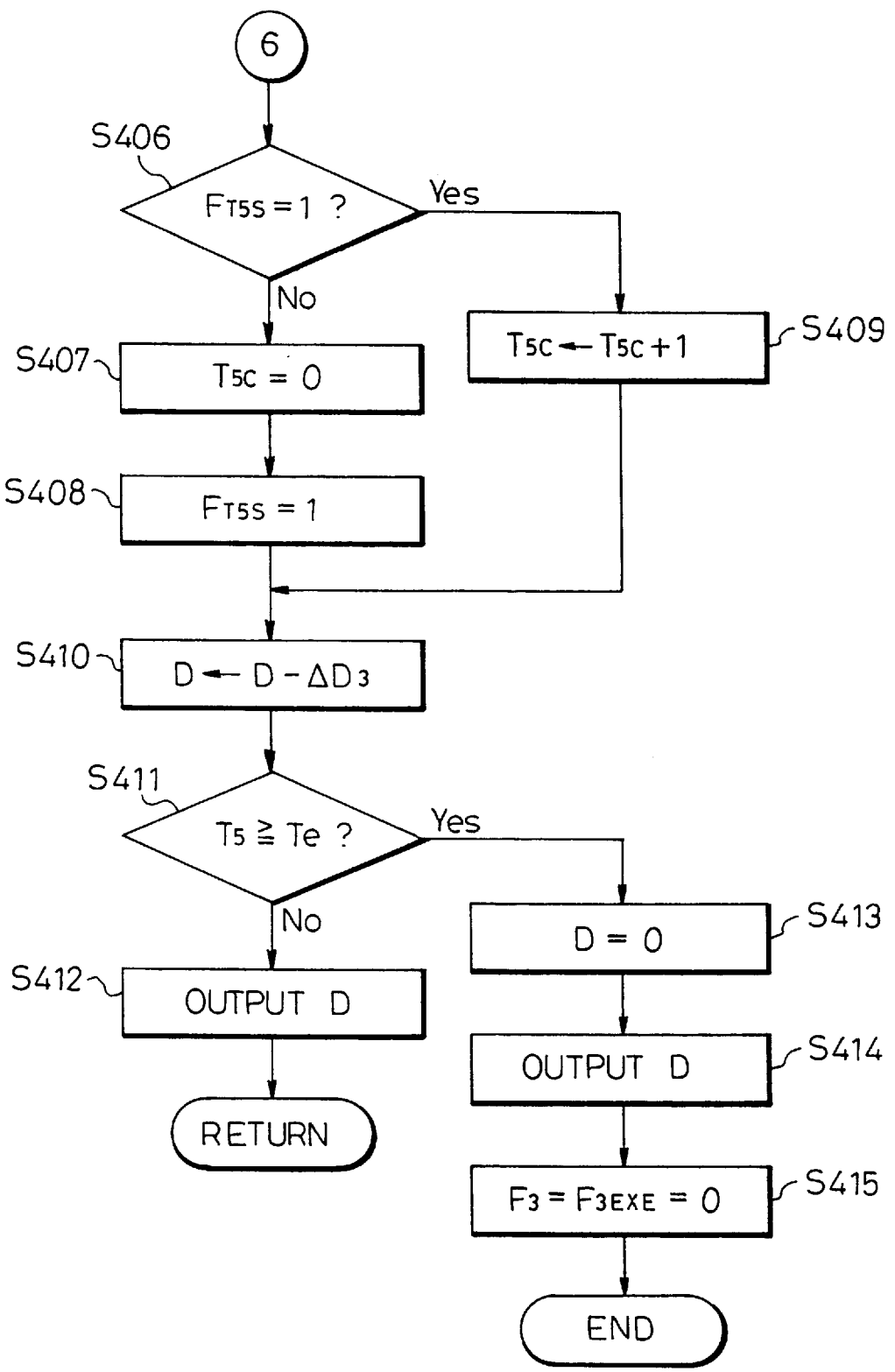
FIG. 12 is a flowchart showing in detail the remainder of the third subroutine.

As shown in detail in FIGS. 11 and 12, in the third subroutine, a determination is made as to whether or not the value of a flag $F_{3EXE}$ is "1" which indicates that a second half of the third subroutine is being executed (Step S401). If the result of this determination is No whether or not a door is opened is determined (Step S402). If the result of the determination in Step S402 is No, the duty ratio is set at a value of $D_{LUX1}$ (Step S403), and this duty ratio $D_{LUX1}$ is output (Step S404). Consequently, the room lamp 5 is lit up at the luminance LUX1 corresponding to the duty ratio $D_{LUX1}$. On the other hand, if the determination result in Step S402 is Yes, the flag $F_{3EXE}$ is set to a value of "1" (Step S405), and a determination is made in Step S406 in FIG. 12 as to whether or not the value of a flag $F_{T5S}$ is "1" which indicates that the luminance of the room lamp 5 is being controllably decreased. If the result of this determination is No, the count value $T_{5C}$ of a fifth timer is reset to "0" (Step S407), and the flag $F_{T5S}$ is set to a value of "1" (Step S408). On the other hand, if the determination result in Step S406 is Yes, a value of "1" is added to the count value $T_{5C}$ of the fifth timer (Step S409).

In Step S410 following Step S408 or S409, a predetermined value $\Delta D_3$ is subtracted from the duty ratio D. Next, whether or not a time period $T_5$ (corresponding to count value $T_{5C}$) measured by the fifth timer is equal to or greater than a predetermined value $T_e$ (for example, 1.2 seconds) is determined (Step S411). If the determination result is No, the duty ratio D updated in Step S410 is output (Step S412). Consequently, the luminance of the room lamp 5 is controlled so as to be decreased.

When the lamp control in the aforementioned Step S404 or S412 is completed, the execution of this subroutine in the present control cycle terminates. When a predetermined time period corresponding to the subroutine execution period has elapsed thereafter, the subroutine is executed again from Step S401.

If the determination result in Step S411 is Yes, on the other hand, the duty ratio D is reset to "0" (Step S413) and the duty ratio D of 0% is output (Step S414), so that the room lamp 5 is turned off. Further, the values of the flags $F_3$ and $F_{3EXE}$ are reset to "0" (Step S415), and the execution of the third subroutine terminates.

Figure 15:
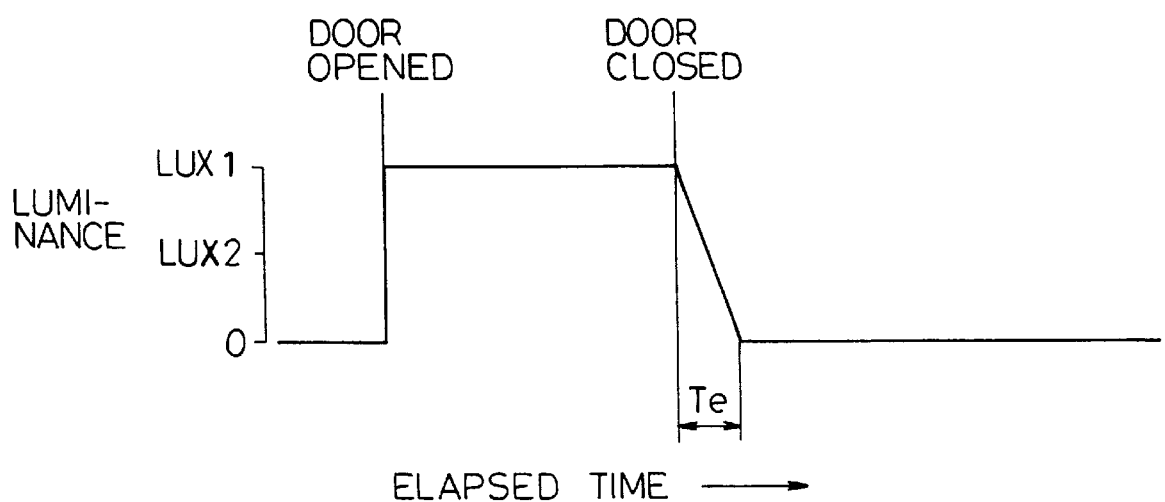
FIG. 15 is a graph showing a change in luminance of a room lamp with elapse of time, caused by the execution of the third subroutine.

As described above, if a door is opened with the IG key 6 being at the IG-on position, the flag $F_3$ is set to a value of "1" in the flag setting subroutine in FIG. 4, and hence the third subroutine is executed in the lamp control routine in FIG. 3. In this case, the luminance of the room lamp 5 is controlled as shown in FIG. 15.

More specifically, when a door is opened, the room lamp 5 is switched from an off condition and comes on at the first luminance LUX1. The luminance of the room lamp 5 gradually decreases from the first luminance LUX1 from the moment when the door is closed thereafter to the moment when a predetermined time period $T_e$ (for example, 1.2 seconds) has elapsed since the closing of the door. The room lamp 5 goes off when the predetermined time $T_e$ has elapsed.

In the following, an example of the turning on/off control of the room lamp 5 will be described with reference to FIG. 16. This on/off control is carried out by the lamp control routine shown in FIG. 3 and including the first, second, and third subroutines.

When the driver or a passenger opens a door of a parked car to get into it (time point of t1 in FIG. 16), the door switch 3 is turned on. At this time, the IG switch 2 is switched off, so that the flag $F_2$ is set to a value of "1" in the flag setting subroutine in FIG. 4. As a result, the execution of the second subroutine is started in the lamp control routine in FIG. 3, and hence the room lamp 5 comes on at the luminance LUX1. When the driver in the car closes the door subsequently, the luminance of the room lamp 5 is decreased by one step from LUX1 to LUX3 at the moment at which a predetermined time period $T_c$ has elapsed since the closing of the door. Further, the luminance of the room lamp 5 is gradually decreased for a predetermined period of time $T_d$. During this period, the insertion of the IG key 6 into the key hole of the IG switch 2 does not affect on the on/off control of the room lamp, so that the luminance of the room lamp 5 is permitted to gradually decrease. Upon elapse of the predetermined time $T_d$ from the moment the luminance of the room lamp 5 begins to decrease, the room lamp 5 goes off (the execution of the second subroutine terminates).

Here, let it be assumed that, after riding in the car, the driver or a passenger needs to get out of the car for some reason. On this occasion, when the IG key 6 is extracted before a door is opened, the IG-key insertion/extraction detecting switch 4 is turned on (time point of t2 in FIG. 16) and the flag $F_1$ is set to a value of "1", so that the execution of the first subroutine is started. Consequently, the room lamp 5 is lit up at the luminance LUX2. After the luminance of LUX2 is kept for a predetermined time period $T_a$, the room lamp 5 becomes dark gradually by fade-out control. When a predetermined time period $T_b$ has elapsed from the start of the fade-out control, the room lamp 5 goes off (the execution of the first subroutine terminates). A similar turning on/off control is carried out when the IG key 6 is extracted, with the doors closed, at the time the driver and passengers get out of the car after driving the car to their destination.

Just after the IG key 6 is extracted, the driver or a passenger usually opens the door to get out of the car. However, the driver sometimes inserts the IG key 6 again and turns it to the IG-on position, without getting out of the car. If the driver opens the door under such a condition (time point of t3 in FIG. 16), the flag $F_3$ is set to a value of "1" in the flag setting subroutine, and hence the execution of the third subroutine is started in the lamp control routine. As a consequence, the room lamp 5 kept off until then comes on at the luminance LUX1. When the door is closed thereafter, the luminance of the room lamp 5 gradually decreases for a predetermined time period $T_e$. Upon elapse of the time period $T_e$ since the door was closed, the room lamp 5 goes off (the execution of the third subroutine terminates).

Subsequently, when the driver turns the IG key 6 to the IG-off position and then withdraws the IG key 6 (time point of t4 in FIG. 16), the flag $F_1$ is set to a value of "1", so that the first subroutine is started. Consequently, the room lamp 5 comes on at the luminance LUX2. When the door is opened (time point of t5) while the room lamp 5 is being switched on (while the first subroutine is being executed), the determination result in Step S202 in the first subroutine becomes Yes, so that the flag $F_1$ is reset to a value of "0" and the flag $F_2$ is set to a value of "1" in the flag setting routine in FIG. 4. Hence, the second subroutine is started in the lamp control routine in FIG. 3.

Figure 16:
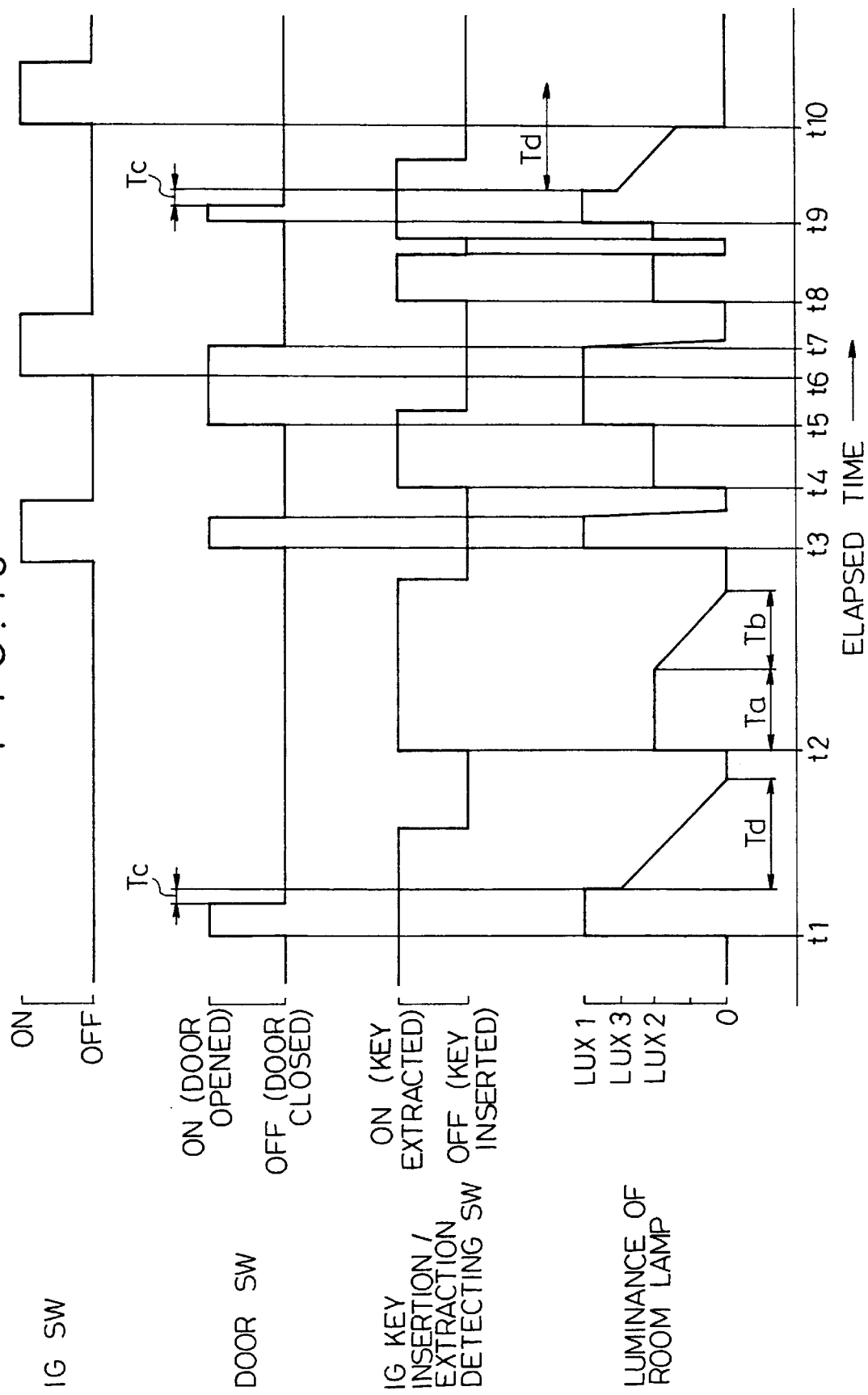
FIG. 16 is a graph showing a change in luminance of a room lamp with elapse of time, caused by the turning on/off of an ignition switch, the opening and closing of a door, and the insertion and extraction of an ignition key during the execution of the lamp control routine shown in FIG. 3.

If the door is opened while the room lamp 5 is being switched on, the control unit 1 judges that the driver or the passenger is going to get out of the car, and causes the luminance of the room lamp 5 to increase to the first luminance LUX1, as shown in FIG. 16 and as indicated by broken line in FIG. 13. Meanwhile, a similar control for increasing the luminance is carried out to increase the luminance of the room lamp 5 from LUX2 to LUX1 in a case where the door is opened while the luminance of the room lamp 5 is being decreasingly controlled by the first subroutine.

Even if the IG key 6 is inserted while the room lamp 5 is being lit up at the luminance LUX1 (during the execution of the second subroutine) (see FIG. 16), the second subroutine is executed successively. Therefore, the luminance of the room lamp 5 is kept at LUX1 as long as the door is open.

When the IG key 6 is subsequently turned to the on position, and hence the IG switch 2 is turned on (time point of t6), the determination result in Step S301 in the second subroutine becomes Yes, so that the flag $F_2$ is reset to a value of "0" and the flag $F_3$ is set to a value of "1" in the flag setting subroutine, whereby the third subroutine is started. Therefore, the luminance of the room lamp 5 is kept maintained at LUX1.

When the door is closed in this condition (time point of t7), the room lamp 5 is controlled such that the luminance gradually decreases, and is then turned off (the execution of the third subroutine terminates).

Afterwards, the first subroutine is started when the IG key 6 is turned to the IG-off position and extracted from the IG switch 2 (time point of t8), and accordingly the room lamp 5 is lit up at the luminance LUX2. When the IG key 6 is inserted in this condition, the execution of the first subroutine is discontinued immediately. In this case, the flags $F_1$, $F_2$, and $F_3$ are reset to a value of "0", respectively, so that the room lamp 5 goes off.

When the IG key 6 is extracted again, the first subroutine is executed, whereby the room lamp 5 comes on at the luminance LUX2 again.

The execution of the first subroutine is discontinued and the execution of the second subroutine is started when the door opened while the room lamp 5 is being lit up at the luminance LUX2 (time point of t9). As a result, the luminance of the room lamp 5 increases to LUX1. When a predetermined time period $T_c$ elapses from the moment the door is closed, the luminance of the room lamp 5 is decreased by one step to LUX3, and is then gradually decreased. The room lamp 5 is switched off, when the IG key 6 is turned to the IG-on position to turn on the IG switch (time point of t10) while the room lamp 5 is being controlled (subjected to fade-out control) such that its luminance gradually decreases.

The above-described example of turning on/off control (FIG. 16) explains various features of the control apparatus and control method of the present invention. Usually, a simple control as shown in FIGS. 13, 14, or 15 is carried out.

The room lamp control apparatus and method of the present invention is not limited to the foregoing embodiment, and may be modified in various manners.

Figure 17:
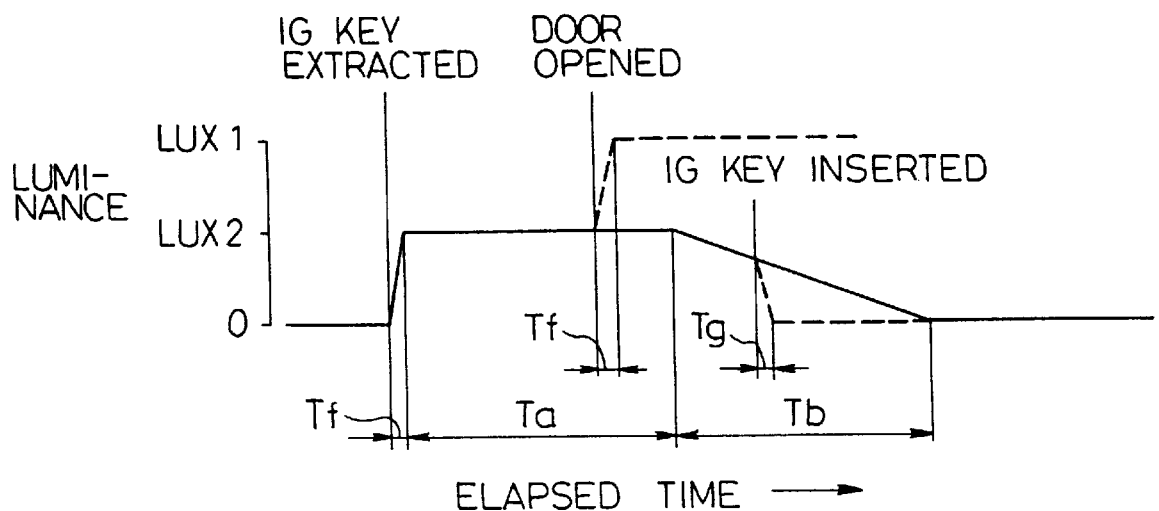
FIG. 17 is a graph showing a change in luminance of a room lamp with elapse of time, caused by the execution of the first subroutine according to a modification of the present invention.

In the lighting-up of the room lamp 5, for example, the room lamp 5 may be controlled in such a manner that the luminance gradually increases from a switched-off state. For instance, the control procedure in the first subroutine executed by the control unit 1 may be modified such that the luminance of the room lamp 5 gradually increases from 0 to LUX2 until a predetermined time period $T_f$ (for example, 0.3 second) elapses from the moment at which the IG key 6 was extracted from the IG switch 2, as shown in FIG. 17. The luminance of the room lamp 5 may be gradually decreased until a predetermined time period $T_g$ (for example, 0.3 second) elapses from the moment at which the IG key 6 was inserted while the first subroutine was being executed, so that the room lamp 5 may be turned off upon elapse of a time period $T_g$. The control flows for the modifications mentioned above and described below can be attained easily by referring to the description of the preferred embodiment; therefore, detailed explanations therefor will be omitted.

Figure 18:
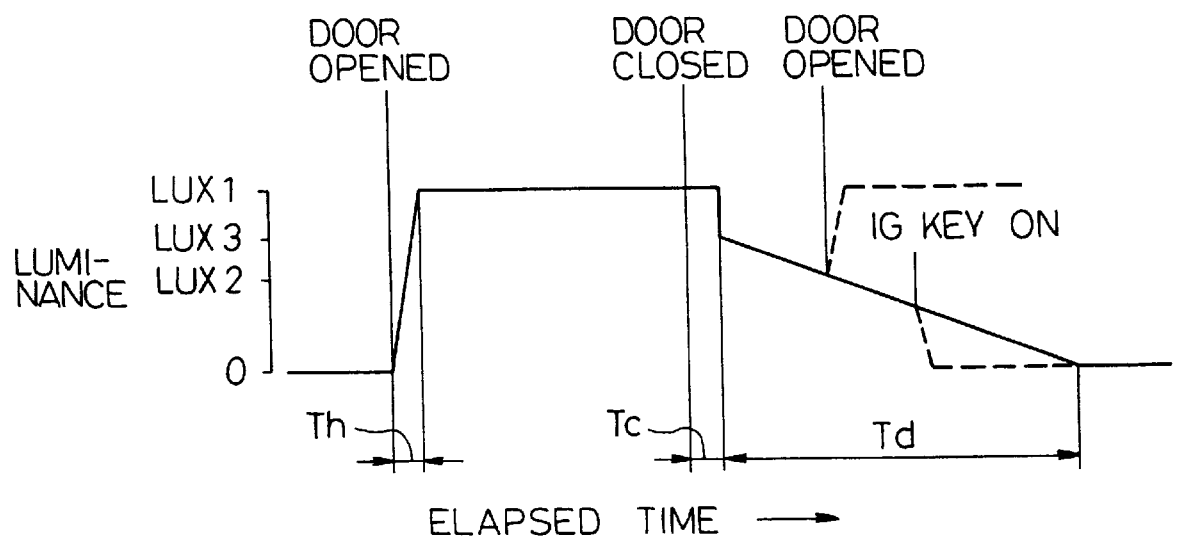
FIG. 18 is a graph showing a change in luminance of a room lamp with elapse of time, caused by the execution of the second subroutine according to a modification of the present invention.

Further, the control procedure in the second subroutine may be modified such that the luminance of the room lamp 5 gradually increases from 0 to LUX1 in a predetermined time period $T_h$ (for example, 0.6 second) when a door is opened with the IG key 6 being at the IG-off position, as shown in FIG. 18.

Figure 19:
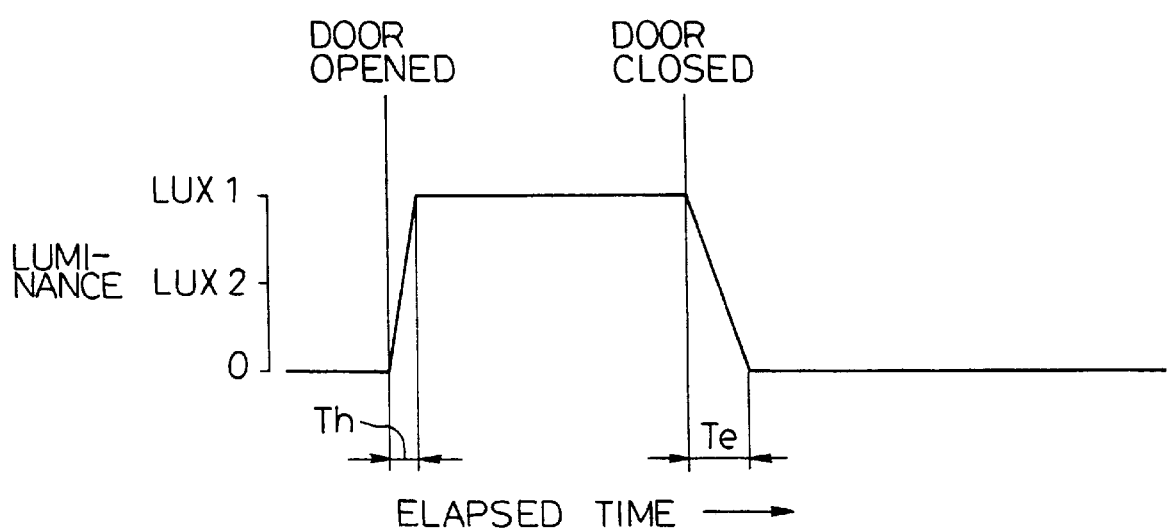
FIG. 19 is a graph showing a change in luminance of a room lamp with elapse of time caused by the execution of the third subroutine according to a modification of the present invention.

Also, the third subroutine may be modified such that the luminance of the room lamp 5 gradually increases from 0 to LUX1 in a predetermined time $T_h$, as shown in FIG. 19, when a door is opened with the IG key 6 being at the IG-on position.

As described above, illumination having a sense of high quality, a sense of hospitality, a sense of control, etc. can be provided by giving short fade-in on the occasion that the room lamp kept in a switched-off state is turned on.

We claim:

1. In a method for controlling an automotive room lamp disposed in an interior of an automobile in which the room lamp is subject to an on/off control responsive to opening and closing of a door of the automobile, the automotive room lamp control method comprising the steps of:
   detecting the opening and closing of the door;
   detecting insertion and extraction of an ignition key into and from an ignition switch of the automobile;
   turning on the room lamp when the ignition key is extracted from the ignition switch with the door being closed, wherein the room lamp is turned on at a second luminance which is lower than a first luminance provided when the room lamp is switched on with the door being open.

2. The automotive room lamp control method according to claim 1, wherein the room lamp is kept lit up at the second luminance for a predetermined time period, and then a luminance of the room lamp is gradually decreased and the room lamp is turned off thereafter.

3. The automotive room lamp control method according to claim 1, wherein the room lamp is lit up at the first luminance when the door is opened while the room lamp is being lit up at the second luminance.

4. The automotive room lamp control method according to claim 3, wherein the first luminance of the room lamp is gradually decreased after a predetermined time period following closing of the door after the door was opened while the room lamp was being lit up at the second luminance, and the room lamp is turned off thereafter.

5. The automotive room lamp control method according to claim 3, wherein a luminance of the room lamp is decreased once to a third luminance when the door, which was opened while the room lamp was being lit up at the second luminance, is closed, the third luminance being lower than the first luminance and higher than the second luminance.

6. The automotive room lamp control method according to claim 3, wherein the first luminance of the room lamp is decreased once to a third luminance after a predetermined time period following closing of the door after the door was opened while the room lamp was being lit up at the second luminance, and is thereafter gradually decreased from a third luminance to an off condition.

7. The automotive room lamp control method according to claim 1, wherein, when the lamp is turned on, a luminance of the room lamp is gradually increased to the second luminance.

8. The automotive room lamp control method according to any one of claims 1–4, wherein a luminance of the room lamp is gradually increased from the second luminance to the first luminance from a moment when the door is opened while the room lamp is being lit up at the second luminance.

9. The automotive room lamp control method according to any one of claims 3 or 4–7, wherein a luminance of the room lamp is gradually increased from the second luminance to the first luminance.

10. In an apparatus for controlling an automotive room lamp disposed in an interior of an automobile in which the room lamp is subject ao an on/off control responsive to opening and closing of a door of the automobile, the automotive room lamp control apparatus comprising:
    door opening/closing detecting means for detecting the opening and closing of the door and for outputting a door-closure signal when the door is closed;
    insertion/extraction detecting means for detecting insertion and extraction of an ignition key into and from an ignition switch of the automobile and for outputting an ignition-key-extraction signal when the ignition key is extracted from the ignition switch;
    control means for turning on the room lamp when supplied with the door-closure signal from said door opening/closing detecting means and with the ignition-key-extraction signal from said insertion/extraction detecting means, wherein said control means switches the room lamp on at a second luminance which is lower than a first luminance provided when the room lamp is switched on with the door being open.

11. The automotive room lamp control apparatus according to claim 10, wherein said control means keeps the room lamp lit up at the second luminance for a predetermined time, gradually decreases a luminance of the room lamp, and then turns off the room lamp.

12. The automotive room lamp control apparatus according to claim 10, wherein said control means turns on the room lamp at the first luminance when the door is opened while the room lamp is being lit up at the second luminance.

13. The automotive room lamp control apparatus according to claim 12, wherein said control means gradually decreases the first luminance of the room lamp a predetermined time period following closing of the door after the door was opened while the room lamp was being lit up at the second luminance, and then said control means turns off the room lamp.

14. The automotive room lamp control apparatus according to any one of claims 10, wherein said control means, after switching the room lamp on, gradually increases luminance of the room lamp to a second luminance from a moment when the ignition key is extracted from the ignition switch with the door being open.

15. In an apparatus for controlling an automotive room lamp disposed in an interior of an automobile in which the room lamp is subject ao an on/off control responsive to opening and closing of a door of the automobile, the automotive room lamp control apparatus comprising:

door opening/closing detecting means for detecting the opening and closing of the door and for outputting a door-closure signal when the door is closed;

insertion/extraction detecting means for detecting insertion and extraction of an ignition key into and from an ignition switch of the automobile and for outputting an ignition-key-extraction signal when the ignition key is extracted from the ignition switch;

control means for turning on the room lamp when supplied with the door-closure signal from said door opening/closing detecting means and with the ignition-key-extraction signal from said insertion/extraction detecting means, wherein the control means switches the room lamp on and gradually increase a lamp luminance to a second luminance which is lower than a first luminance provided when the room lamp is switched on with the door being open.

* * * * *